(12) United States Patent
Kothari et al.

(10) Patent No.: US 10,433,203 B1
(45) Date of Patent: Oct. 1, 2019

(54) PROVIDING A QUALITY OF SERVICE TO WIRELESS DEVICES ATTACHED TO RELAY ACCESS NODES

(71) Applicant: Sprint Spectrum LP, Overland Park, KS (US)

(72) Inventors: Pratik Kothari, Maharashtra (IN); Hemanth Pawar, Brambleton, VA (US); Krishna Sitaram, Chantilly, VA (US); Chunmei Liu, Great Falls, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 28 days.

(21) Appl. No.: 15/491,155

(22) Filed: Apr. 19, 2017

(51) Int. Cl.
*H04W 28/02* (2009.01)
*H04W 16/32* (2009.01)
*H04W 88/04* (2009.01)

(52) U.S. Cl.
CPC ....... *H04W 28/0268* (2013.01); *H04W 16/32* (2013.01); *H04W 88/04* (2013.01)

(58) Field of Classification Search
CPC .. H04W 28/0268; H04W 16/32; H04W 88/04
See application file for complete search history.

(56) References Cited

U.S. PATENT DOCUMENTS

| 8,724,472 | B2 | 5/2014 | Huang et al. | |
|---|---|---|---|---|
| 8,885,542 | B2 * | 11/2014 | Bucknell | H04B 7/155 370/315 |
| 8,989,007 | B2 * | 3/2015 | Raaf | H04L 45/125 370/235 |
| 9,088,939 | B2 | 7/2015 | Ulupinar et al. | |
| 2011/0228700 | A1 * | 9/2011 | Mildh | H04B 7/2606 370/254 |
| 2012/0250603 | A1 * | 10/2012 | Huang | H04W 72/0486 370/315 |
| 2012/0300616 | A1 * | 11/2012 | Zeng | H04W 72/1289 370/216 |
| 2014/0105136 | A1 * | 4/2014 | Tellado | H04L 5/0058 370/329 |
| 2014/0162676 | A1 * | 6/2014 | Shaw | H04W 76/12 455/452.2 |
| 2014/0226547 | A1 * | 8/2014 | Zainaldin | H04B 7/15521 370/311 |
| 2014/0286295 | A1 * | 9/2014 | Liu | H04W 72/10 370/329 |
| 2016/0066336 | A1 * | 3/2016 | Sevindik | H04W 72/10 370/315 |
| 2017/0331577 | A1 * | 11/2017 | Parkvall | H04J 11/0079 |

* cited by examiner

*Primary Examiner* — Ivan O Latorre

(57) ABSTRACT

Systems, methods, and processing nodes for providing a quality of service (QoS) to wireless devices attached to a relay access node include determining that a first amount of a first traffic type between a donor access node and a first one or more wireless devices in communication with the donor access node via the relay access node exceeds a threshold amount, and adjusting a quality of service (QoS) parameter of a wireless backhaul link between the relay access node and the donor access node from a first default QoS parameter to a new QoS parameter.

17 Claims, 9 Drawing Sheets

PROVIDING A QUALITY OF SERVICE TO WIRELESS DEVICES ATTACHED TO RELAY ACCESS NODES

TECHNICAL BACKGROUND

As wireless networks evolve and grow, there are ongoing challenges in providing high-quality service to increasing numbers of wireless devices in various coverage areas of a wireless network. One approach to improving service quality and coverage is to designate a wireless device as a relay access node for relaying communication between a base station or donor access node, and an end-user wireless device. Wireless devices designated as relays (henceforth, "relay wireless devices") may be used at the edge of a coverage area of a donor access node to improve coverage and/or service, as well as in crowded areas having a high number of other wireless devices to increase the available throughput to the end-user wireless devices being relayed.

However, relay wireless devices may be limited in their ability to effectively service end-user wireless devices that are attached to it, particularly if the throughput of the backhaul connection between the relay wireless device and the donor access node is limited. Further, certain types of traffic that are resource-intensive (such as, for instance, voice over LTE or gaming) require bearers with a specific set of quality of service (QoS) parameters to ensure a satisfactory user experience. While wireless devices directly-connected to a donor access node may be assigned bearers with adequate QoS parameters, wireless devices attached to a relay access node may suffer from unsatisfactory user experience if the backhaul connection is assigned inadequate or otherwise different QoS parameters.

OVERVIEW

Exemplary embodiments described herein include systems, methods, and processing nodes for providing a quality of service (QoS) to wireless devices attached to a relay access node. An exemplary method for providing a QoS to wireless devices attached to a relay access node includes determining that a first amount of a first traffic type between a donor access node and a first one or more wireless devices in communication with the donor access node via the relay access node exceeds a threshold amount, and adjusting a quality of service (QoS) parameter of a wireless backhaul link between the relay access node and the donor access node from a first default QoS parameter to a new QoS parameter.

An exemplary system for providing a QoS to wireless devices attached to a relay access node includes a donor access node configured to provide wireless services to a first plurality of wireless devices attached to the donor access node and to a second plurality of wireless devices attached to a relay access node. The relay access node is communicably coupled to the donor access node via a wireless backhaul link. The system further includes a processor coupled to the donor access node for configuring the donor access node to perform operations including determining that a first resource requirement of the first plurality of wireless devices is smaller than a second resource requirement of the second plurality of wireless devices, and changing a class identifier of the wireless backhaul link to meet the second resource requirement.

An exemplary processing node for providing a QoS to wireless devices attached to a relay node is configured to perform operations including obtaining a first number of transport bearers between a first one or more wireless devices and a wireless network, wherein the first one or more wireless devices are attached to a donor access node, obtaining a second number of transport bearers between a second one or more wireless devices and the wireless network, wherein the second one or more wireless devices are attached to a relay access node communicably coupled to the donor access node via a first radio bearer, determining that the second number exceeds the first number, and modifying a first set of QoS parameters of the first radio bearer to meet a resource requirement of the second number of wireless devices.

DETAILED DESCRIPTION

Figure 1:
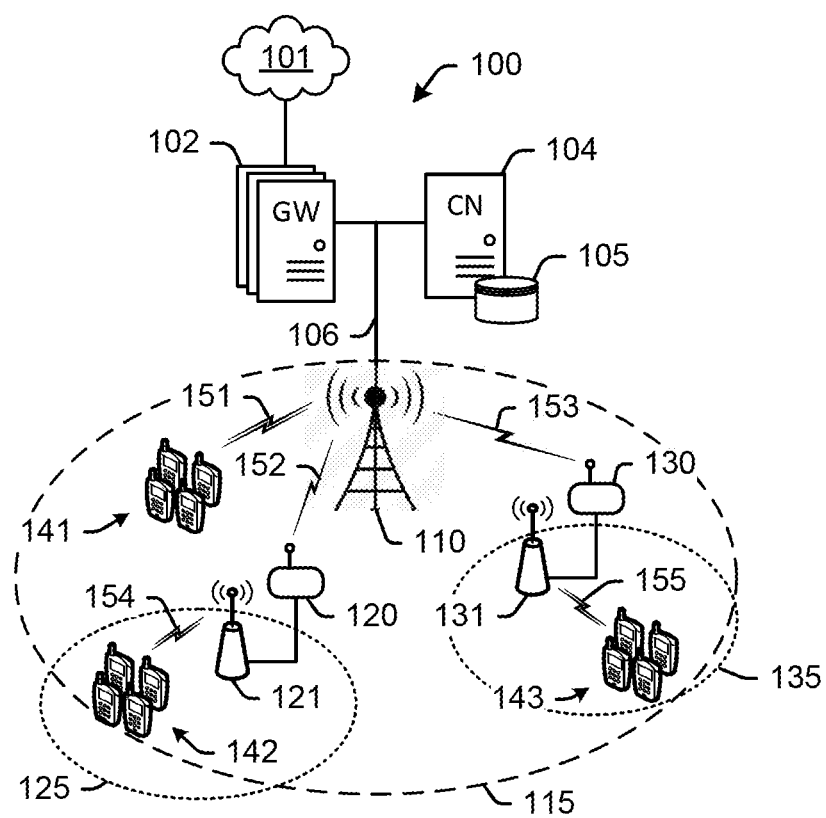
FIG. 1 depicts an exemplary system for providing a QoS to wireless devices attached to a relay access node.

In embodiments disclosed herein, a donor access node is configured to provide access to a communication network for a first one or more wireless devices attached directly to the donor access node (hereinafter, "directly-connected wireless devices") over a wireless air interface deployed by the donor access node. The donor access node is further configured to provide access to the communication network for a second one or more wireless devices attached to a relay access node. The relay access node is communicably coupled to the donor access node via a wireless backhaul link on the wireless air interface. For example, the relay access node can comprise a relay wireless device configured to communicate with the donor access node over the wireless backhaul link. The relay wireless device can be communicatively coupled to a small-cell access node, which deploys a second wireless air interface, thereby enabling the second one or more wireless devices to attach to the small-cell access node. Alternatively or in addition, the relay access node may integrate components of both the relay wireless device and the small-cell access node into a single unit.

As further described herein, a quality of service of the wireless backhaul link may be adjusted to meet resource requirements of the second one or more devices that are attached to the relay access node. In some embodiments, a resource requirement of the second one or more wireless devices is compared with a resource requirement of the directly-connected wireless devices and, if the resource requirement of the second one or more wireless devices exceeds the resource requirement of the directly-connected wireless devices, then a QoS parameter of the wireless backhaul link is adjusted to meet the resource requirement. Adjusting the QoS parameter of the wireless backhaul link can improve the performance of the wireless backhaul link, consequently improving the performance of the wireless air interface deployed by the relay access node. Alternatively or in addition, a type of traffic that requires a specific QoS such as, for instance, voice-over LTE (VoLTE) traffic, may be monitored for each of the directly-connected wireless devices and the second one or more wireless devices in communication with the donor access node via the relay access node. An amount of the type of traffic can be compared with predefined or dynamic thresholds to determine how to adjust the QoS parameter.

In some embodiments, determining amounts of different types of traffic may be based on monitoring radio bearers associated with each of the directly-connected wireless devices and the second one or more wireless devices attached to the relay access node. For example, traffic over a transport bearer between a wireless device and a gateway (such as an evolved packet system or EPS bearer) or a radio bearer between a wireless device and the relay access node may be monitored to determine whether or not an amount of traffic exceeds a threshold amount. Further, amounts or resource requirements of the type of traffic may be compared with amounts or resource requirements of other types of traffic in order to determine how to adjust the QoS parameter of the wireless backhaul link. For example, a ratio of the first type of traffic to other types of traffic is compared with a threshold ratio prior to adjusting the QoS parameter. Such determinations can further be based on requests from the wireless devices or from other network entities to set up said radio and transport bearers.

Adjusting the QoS parameter of the wireless backhaul link can comprise adjusting a QoS parameter of a radio bearer between the relay access node and the donor access node from a first default QoS parameter to a new QoS parameter, or from the new QoS parameter to the default QoS parameter. Adjusting the QoS parameter further comprises adjusting a class identifier of the wireless backhaul link to meet the resource requirement of the wireless devices attached to the relay access node. QoS parameters include one or more of a QoS Class Indicator (QCI) of the radio bearer, a priority, a delay, a loss rate, or a guaranteed bit rate (GBR) provided by the radio bearer, among others. In some embodiments, adjusting the QCI triggers other adjustments, as provided by a network configuration. In some embodiments, the new QoS parameter is the same as a default QoS parameter associated with the directly-connected wireless devices, and/or bearers associated therewith. For example, modifying the first set of QoS parameters of the wireless backhaul link to meet the resource requirement of the wireless devices attached to the relay access node comprises setting QoS parameters of the backhaul link as the same as the default QoS parameters of the directly-connected wireless devices.

The embodiments disclosed herein therefore improve the transport efficiency of the backhaul link in relay-based networks and, therefore, increase the number of end-user devices that can be served by relay access nodes, particularly in a VoLTE system. These and additional operations are further described with respect to the embodiments depicted in FIGS. 1-5 below.

FIG. 1 depicts an exemplary system 100 for providing a QoS to wireless devices attached to a relay access node. System 100 comprises a communication network 101, gateways 102, controller node 104, access node 110, a first relay access node comprising relay wireless device 120 and small-cell access node 121, a second relay access node comprising relay wireless device 130 and small-cell access node 131, and end-user wireless devices 141, 142, and 143. Access node 110 can be any network node configured to deploy a wireless air interface to which wireless devices 141-143 and relay wireless devices 120, 130 can attach, thereby gaining access to network services provided by network 101. Access node 110 can be a standard macrocell access node, such as a base transceiver station, a radio base station, an eNodeB device, or an enhanced eNodeB device. In an exemplary embodiment, a macrocell access node can have a coverage area 115 in the range of approximately 5 km-35 km and an output power in the tens of watts. In this embodiment, access node 110 is configured to provide network access to first one or more wireless devices 141 that are within coverage area 115 and are attached directly to access node 110 over a wireless air interface deployed by access node 110. For instance, a plurality of radio bearers 151 may be deployed on an air interface of access node 110, with each of the plurality of radio bearers 151 corresponding to each of wireless devices 141. Plurality of radio bearers 151 may be of a predefined frequency band or sub-band.

Wireless devices 142, 143 at or near a cell edge of coverage area 115 may benefit from using first and second relay access nodes respectively comprising relay wireless devices 120, 130 and small-cell access node 121, 131. Consequently, access node 110 may be termed a "donor" access node. To enable relaying, donor access node 110 can be further configured to deploy additional radio bearers 152 and 153, to which relay wireless devices 120, 130 can respectively attach. Radio bearers 152 and 153 (hereinafter referred to as wireless backhaul links) can use the same frequency band as radio bearers 151, or any other frequency band supported by donor access node 110 and relay wireless devices 120, 130. Each relay wireless device 120, 130 may comprise a customer premise equipment (CPE), which can be any stationary LTE wireless device having a stronger computational & RF capability versus standard wireless devices, as well as a directional antenna and a dedicated power supply.

Each relay wireless device 120, 130 is further communicatively coupled to small-cell access nodes 121, 131, respectively. Small-cell access nodes 121, 131 can comprise any short range, low power, small-cell access nodes such as a microcell access node, a picocell access node, a femtocell access node, or a home eNodeB device. Each of small-cell access nodes 121, 131 deploys another wireless air interface having coverage areas 125, 135 respectively. For example, an air interface deployed by small-cell access node 121 can provide radio bearers 154 corresponding to wireless devices 142, and an air interface deployed by small-cell access node 131 can provide radio bearers 155 corresponding to wireless devices 143. As a consequence, wireless devices 142, 143 may access network services using the combination of small-cell access nodes 121, 131 with relay wireless devices 120, 130 and wireless backhaul links 152, 153, rather than directly connecting to (and potentially overloading) donor access node 110, which may be serving numerous other devices (such as wireless devices 141, among others). Moreover, wireless devices among wireless devices 142, 143 that are outside range 115 may access network services from donor access node 110 by virtue of being connected to one of small-cell access nodes 121, 131. Further, radio bearers 154, 155 can utilize a different frequency sub-band than those deployed by access node 110, thereby minimizing potential interference, and providing a stronger signal for access by wireless devices 142, 143.

In an embodiment, relay wireless device 120, 130 can be configured to function as one or more of a layer 1 (L1), layer 2 (L2), or layer 3 (L3) relay. A layer 1 relay functions as a booster or repeater. In other words, a layer 1 relay device performs an amplify and forward (AF) function. RF signals received from donor access node 110 are amplified and transmitted by relay wireless device 120, 130 to one or more of wireless devices 142, 143. Likewise, RF signals received from wireless devices 142, 143 are amplified and transmitted by relay wireless device 120, 130 to donor access node 110. Alternatively or in addition, a layer 2 relay device performs a decode and forward (DF) function. RF signals received from donor access node 110 are demodulated and decoded, then encoded and modulated again before being transmitted by relay wireless device 120, 130 to one or more of wireless devices 142, 144. Likewise, RF signals received from one or more of wireless devices 142, 144 are demodulated and decoded, then encoded and modulated again before being transmitted by relay wireless device 120, 130 to donor access node 110. Alternatively or in addition, a layer 3 relay device also performs a decode and forward function. However, a layer 3 relay device also performs additional processing (such as ciphering and/or data concatenation/segmentation/resassembly) In other words, relay wireless device 120, 130 performs demodulation and decoding of the received RF signals (either uplink or downlink), processes received data, then encodes, modulates, and transmits the data to one or more of wireless devices 142, 143.

In operation, a quality of service of wireless backhaul links 152, 153 may be adjusted to meet resource requirements of wireless devices 142, 143 respectively attached to small-cell access nodes 121 and 131. For example, a resource requirement of wireless devices 142 is compared with a resource requirement of wireless devices 141 (hereinafter, directly-connected wireless devices) and, if the resource requirement of the wireless devices 142 exceeds the resource requirement of directly-connected wireless devices 141, then a QoS parameter of wireless backhaul link 152 is adjusted to meet the resource requirement. Adjusting the QoS parameter of wireless backhaul link 152 can improve the performance of the wireless air interface deployed by small-cell access node 121, thereby improving a user experience of wireless devices 142. Analogous operations may be performed with radio bearer 153 to meet the requirements of wireless devices 143 attached to small-cell access node 131. In some embodiments, requirements of both sets of wireless devices 142 and 143 may be compared, and QoS parameters of wireless backhaul links 152 and 153 adjusted accordingly, as further described herein and with reference to FIGS. 6-8.

Alternatively or in addition, a type of traffic that requires a specific QoS (such as, for instance, VoLTE traffic) may be monitored for each of wireless devices 141, 142, and 143, and amounts of the type of traffic compared with predefined or dynamic thresholds to determine how to adjust the QoS parameter. For example, determining amounts of different types of traffic for wireless devices 141 may be based on monitoring traffic over radio bearers 151, and determining amounts of different types of traffic for wireless devices 142 may be based on monitoring traffic over radio bearers 154. Further, traffic may be monitored for one or more transport bearers between wireless devices 141, 142 and gateway 102. Such a transport bearer may be an evolved packet system (EPS) bearer, as further described herein and with reference to FIG. 5. Amounts of the type of traffic may be compared with each other, with different thresholds, and with amounts (or resource requirements) of other types of traffic in order to determine how to adjust the QoS parameter of a wireless backhaul link.

Further, adjusting the QoS parameter of one or both of wireless backhaul links 152, 153 can comprise adjusting a QoS parameter of a radio bearer using wireless backhaul link 152 between relay wireless device 120 and donor access node 110, or a QoS parameter of a radio bearer using wireless backhaul link 153 between relay wireless device 130 and donor access node 110. The QoS parameter may be changed from a first default QoS parameter to a new QoS parameter, or from the new QoS parameter to the default QoS parameter, depending on changes in the traffic amount or resource requirement thereof. In other words, the QoS parameter is dynamically adjusted in real time based on the resource requirements or amounts of traffic. Adjusting the QoS parameter further comprises adjusting a class identifier of one or both wireless backhaul links 152, 153 to meet the resource requirement of wireless devices 142, 143 respectively. QoS parameters include one or more of a QoS Class Indicator (QCI) of the radio bearer, a priority, a delay, a loss rate, or a guaranteed bit rate provided by the radio bearer. In some embodiments, adjusting the QCI triggers other adjustments, as provided by a network configuration.

In some embodiments, the new QoS parameter is the same as a default QoS parameter of bearers 151 between directly-connected wireless devices 141 and donor access node 110. For example, for any of wireless devices 141 engaged in the same type of traffic (e.g. VoLTE), a default set of QoS parameters may have a low latency or delay, a higher modulation and coding scheme (MCS), and/or a guaranteed bit rate (GBR). Thus, upon determining that a QoS parameter of wireless backhaul link 152 requires adjustment, the QoS parameter may be modified to be the same as a default QoS parameter of radio bearers 151. Further, and as described below with reference to FIG. 5, the QoS parameter may be set to match a QoS parameter of a transport bearer between a wireless device and a gateway or other network element. Further, a new class identifier may be defined for relay wireless devices 120, 130, with the new class identifier being associated with QoS parameters (such as delay, jitter, guaranteed bit rate, etc.) that are similar or identical to QoS parameters of transport bearers as described herein.

Access nodes 110, 121, 131 can comprise a processor and associated circuitry to execute or direct the execution of computer-readable instructions as further described herein. Access nodes 110, 121, 131 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Access nodes 110, 121, 131 can receive instructions and other input at a user interface. At least access node 110 communicates with gateway nodes 102 and controller node 104 via communication link 106. Components of access nodes 110, 121, 131 are further described below with reference to FIGS. 2-4.

Wireless devices 141, 142, 143 may be any device, system, combination of devices, or other such communication platform capable of communicating wirelessly with access nodes 110, 121, 131 using one or more frequency bands deployed by said access nodes. Wireless devices 141, 142, 143 may be, for example, a mobile phone, a wireless phone, a wireless modem, a personal digital assistant (PDA), a voice over internet protocol (VoIP) phone, a voice over packet (VOP) phone, or a soft phone, as well as other types of devices or systems that can exchange audio or data via access nodes. Other types of communication platforms are possible. In some embodiments, relay wireless devices 120, 130 includes stronger computational & radiofrequency capabilities than an average wireless device, as well as a directional antenna, and dedicated power supply, so that they can sustain an over-the-air backhaul link for wireless devices 142, 143 that respectively attach to small-cell access nodes 121, 131.

Communication network 101 can be a wired and/or wireless communication network, and can comprise processing nodes, routers, gateways, and physical and/or wireless data links for carrying data among various network elements, including combinations thereof, and can include a local area network a wide area network, and an internetwork (including the Internet). Communication network 101 can be capable of carrying data, for example, to support voice, push-to-talk, broadcast video, and data communications by wireless devices 141, 142, 143. Wireless network protocols can comprise MBMS, code division multiple access (CDMA) 1×RTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), and Worldwide Interoperability for Microwave Access (WiMAX). Wired network protocols that may be utilized by communication network 101 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 101 can also comprise additional base stations, controller nodes, telephony switches, internet routers, network gateways, computer systems, communication links, or some other type of communication equipment, and combinations thereof.

Communication link 106 can use various communication media, such as air, space, metal, optical fiber, or some other signal propagation path—including combinations thereof. Communication link 106 can be wired or wireless and use various communication protocols such as Internet, Internet protocol (IP), local-area network (LAN), optical networking, hybrid fiber coax (HFC), telephony, T1, or some other communication format—including combinations, improvements, or variations thereof. Wireless communication links can be a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), or Long Term Evolution (LTE), or combinations thereof. Communication link 106 may include S1 communications links. Other wireless protocols can also be used. Communication link 106 can be a direct link or might include various equipment, intermediate components, systems, and networks. Communication link 106 may comprise many different signals sharing the same link Gateway nodes 102 can be any network node or plurality of network nodes that are configured to interface with other network nodes using various protocols. Gateway nodes 102 can communicate user data over system 100. Gateway nodes 102 can be standalone computing devices, computing systems, or network components, and can be accessible, for example, by a wired or wireless connection, or through an indirect connection such as through a computer network or communication network. For example, gateway nodes 102 can include a serving gateway (S-GW) and/or a public data network gateway (P-GW), etc. Gateway nodes 102 can include a relay S-GW/P-GW combination for providing gateway services to relay wireless devices 120, 130, as well as a UE S-GW/P-DW combination for providing gateway services to one or more of wireless devices 141, 142, 143. In embodiments described herein, data packets such as voice over IP (VoIP) data packets may be routed from one or more of wireless devices 141, 142, 143 to a relay S-GW/P-GW first, and then to a UE S-GW/P-GW. However, persons having ordinary skill in the art would recognize that gateway nodes 102 are not limited to any specific technology architecture, such as Long Term Evolution (LTE), and can be used with any network architecture and/or protocol.

Each of gateway nodes 102 can comprise a processor and associated circuitry to execute or direct the execution of computer-readable instructions to obtain information. Gateway nodes 102 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Gateway nodes 102 can receive instructions and other input at a user interface.

Controller node 104 can be any network node configured to communicate information and/or control information over system 100. Controller node 104 can be configured to transmit control information associated with a handover procedure. Controller node 104 can be a standalone computing device, computing system, or network component, and can be accessible, for example, by a wired or wireless connection, or through an indirect connection such as through a computer network or communication network. For example, controller node 104 can include a mobility management entity (MME), a Home Subscriber Server (HSS), a Policy Control and Charging Rules Function (PCRF), an authentication, authorization, and accounting (AAA) node, a rights management server (RMS), a subscriber provisioning server (SPS), a policy server, etc. One of ordinary skill in the art would recognize that controller node 104 is not limited to any specific technology architecture, such as Long Term Evolution (LTE) and can be used with any network architecture and/or protocol.

Controller node 104 can comprise a processor and associated circuitry to execute or direct the execution of computer-readable instructions to obtain information. Controller node 104 can retrieve and execute software from storage, which can include a disk drive, a flash drive, memory circuitry, or some other memory device, and which can be local or remotely accessible. In an exemplary embodiment, controller node 104 includes a database 105 for storing access node characteristics. The software comprises computer programs, firmware, or some other form of machine-readable instructions, and may include an operating system, utilities, drivers, network interfaces, applications, or some other type of software, and combinations thereof. Controller node 104 can receive instructions and other input at a user interface.

Other network elements may be present in system 100 to facilitate communication but are omitted for clarity, such as base stations, base station controllers, mobile switching centers, dispatch application processors, and location registers such as a home location register or visitor location register. Furthermore, other network elements that are omitted for clarity may be present to facilitate communication, such as additional processing nodes, routers, gateways, and physical and/or wireless data links for carrying data among the various network elements, e.g. between access node 110 and communication network 101.

Figure 2:
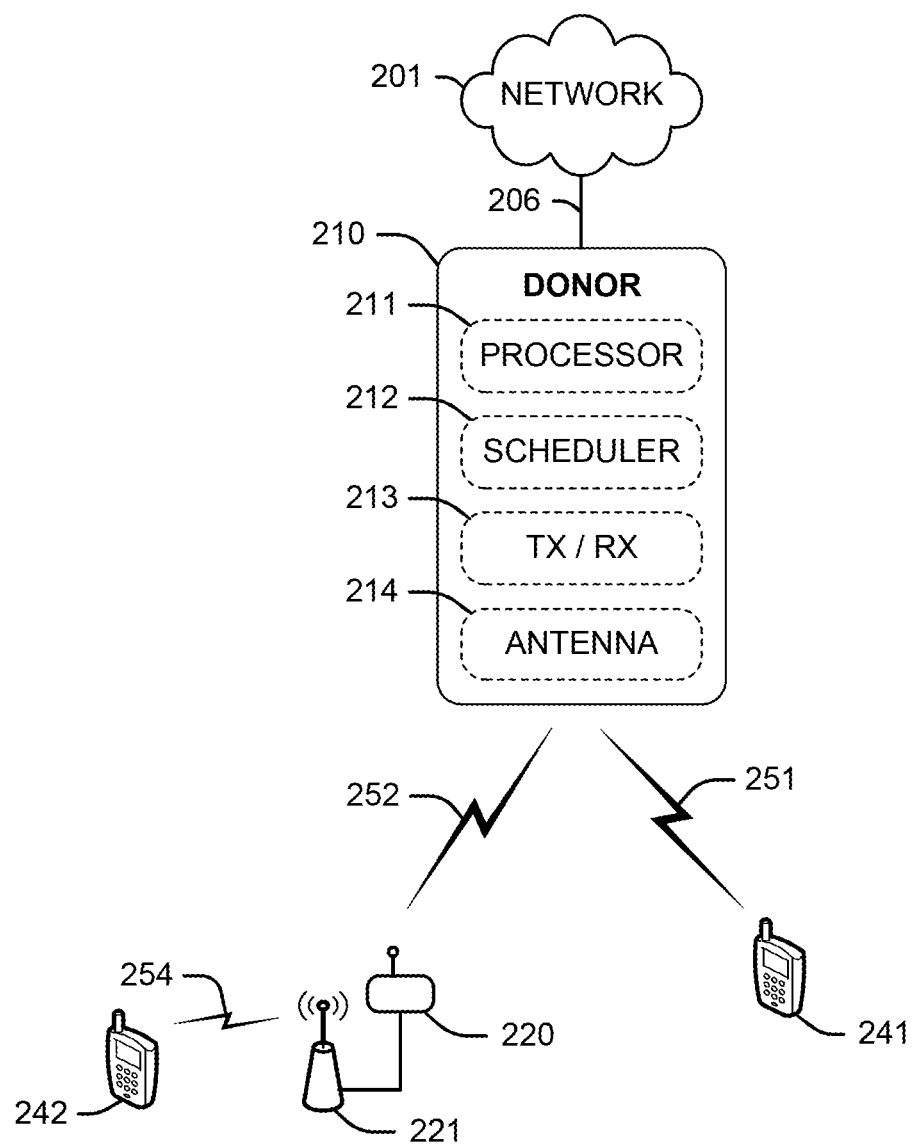
FIG. 2 depicts an exemplary donor access node for providing a QoS to wireless devices attached to a relay access node.

FIG. 2 depicts an exemplary donor access node 210 for providing a QoS to wireless devices attached to a relay access node. As described herein, donor access node 210 provides access to network services from network 201 to wireless devices 241, 242 either directly, or relayed via a combination of a relay wireless device 220 and small-cell access node 221. In this embodiment, donor access node 210 is illustrated as being in communication with network 201 via communication link 206, and comprising a processor 211, scheduler 212, transceiver 213, and antenna 214. Communication link 206 may be any interface that enables communication between donor access node 210 and network 201, such as an S1 or S4/S5 interface. Other network nodes such as gateways and controllers may be present but are not shown for purposes of simplicity. Processor 211 executes operations based on instructions provided in scheduler 212. Therefore, scheduler 212 may be a memory or other logical unit that comprises instructions for performing operations further described herein. For example, scheduler 212 schedules wireless resources on an air-interface deployed by combination of transceiver 213 and antenna 214. Transceiver 213 and antenna 214 enable wireless communication with one or more wireless devices, such as wireless device 241, or relay wireless device 220. Further scheduler 212 includes instructions for obtaining resource requirements of wireless devices 241, 242 and allocating resources and assigning QoS parameters to each of radio bearers 251 and 252, as further described herein.

Figure 3:
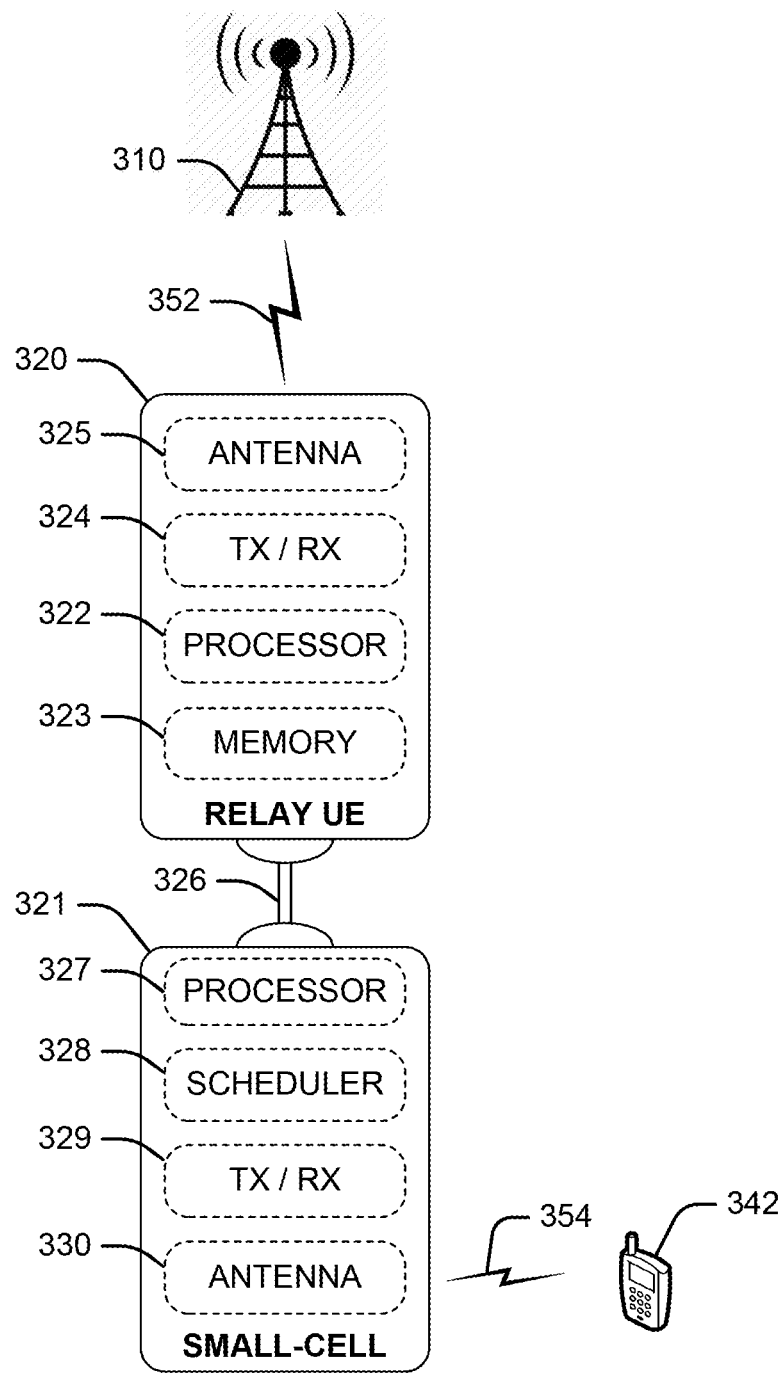
FIG. 3 depicts an exemplary relay access node comprising a relay wireless device coupled to a small-cell access node.

FIG. 3 depicts an exemplary relay access node comprising a relay wireless device 320 coupled to a small-cell access node 321. Relay wireless device 320 is illustrated as comprising an antenna 325 for direct (i.e. unrelayed) communication with donor access node 310 via wireless backhaul link 352, a transceiver 324, a processor 322, and a memory 323 for storing instructions that enable relay wireless device 320 to perform operations described herein. In some embodiments, relay wireless device 320 is referred to as a customer premise equipment (CPE), which includes any stationary LTE wireless device having a stronger computational & RF capability versus standard wireless devices, as well as a directional antenna and a dedicated power supply, enabling relay wireless device 320 to efficiently provide resources to wireless devices 342 via small-cell access node 321. Consequently, small-cell access node 321 may be co-located with relay wireless device 320, and is connected to relay wireless device 320 via a communication interface 326. Communication interface 326 may be any interface that enables direct communication between relay wireless device 320 and small-cell access node 321, such as USB, FireWire, Ethernet, or any other serial, parallel, analog, or digital interface.

Small-cell access node 321 is illustrated as comprising a processor 327 and a scheduler 328 for storing instructions that are executed by processor 327. Scheduler 328 may be a memory or other logical unit that comprises instructions for performing operations further described herein. For example, scheduler 328 schedules wireless resources on an air-interface deployed by combination of transceiver 329 and antenna 330, and can further determine and apply QoS parameters to radio bearer 354 deployed therefrom, based on a requirement of wireless device 342. In some embodiments, small-cell access node 321 may be a home eNodeB. Moreover, although only one transceiver is depicted in each of relay wireless device 320 and small-cell access node 321, additional transceivers may be incorporated in order to facilitate communication across interface 326 and other network elements.

In operation, relay wireless device 320 relays network services from donor access node 310 to wireless device 342 via small-cell access node 321. Relay wireless device 320 may begin to function as a relay wireless device by sending a message to donor access node 310 to indicate to donor access node 310 that wireless device 320 is functioning as a relay wireless device. In some embodiments, wireless device 320 can request to send a buffer status report to donor access node 310. Donor access node 310 can grant this request in a conventional manner. Relay wireless device 320 may respond to the grant by sending a short buffer status report. This short buffer status report is associated with a logical channel group that indicates the buffer status report is communicating the status of relay wireless device 320 as a relay, and thus is not asking for additional resource allocations (like a 'conventional' buffer status report would indicate). In other words, when relay wireless device 320 responds with a buffer status report for the 'special' logical channel group, it means that the buffer status report is not actually reporting the status of a buffer. Rather, this buffer status report indicates that the wireless device is now functioning as a relay. Once status of relay wireless device 320 is established, relay wireless device 320 may instruct small-cell access node 321 to start accepting connection requests from one or more wireless devices such as wireless device 342.

Further, based on the indication of relay status, donor access node 310 may alter how relay wireless device 320 is treated. For example, relay wireless device 320 may be provided with preferential treatment because it is functioning as a relay. In an exemplary embodiment, a specific class indicator is assigned to wireless backhaul link 352 between relay wireless device 320 and donor access node 310. The class indicator may be a QCI that is different from other QCIs assigned to wireless devices that are directly connected to donor access node 310. In other embodiments (and as described herein), upon determining that a resource requirement or traffic type of wireless device 342 meets a threshold or other criteria, the class indicator of wireless backhaul link 352 can be adjusted to meet the resource requirement or provide an appropriate QoS for the traffic type.

Figure 4:
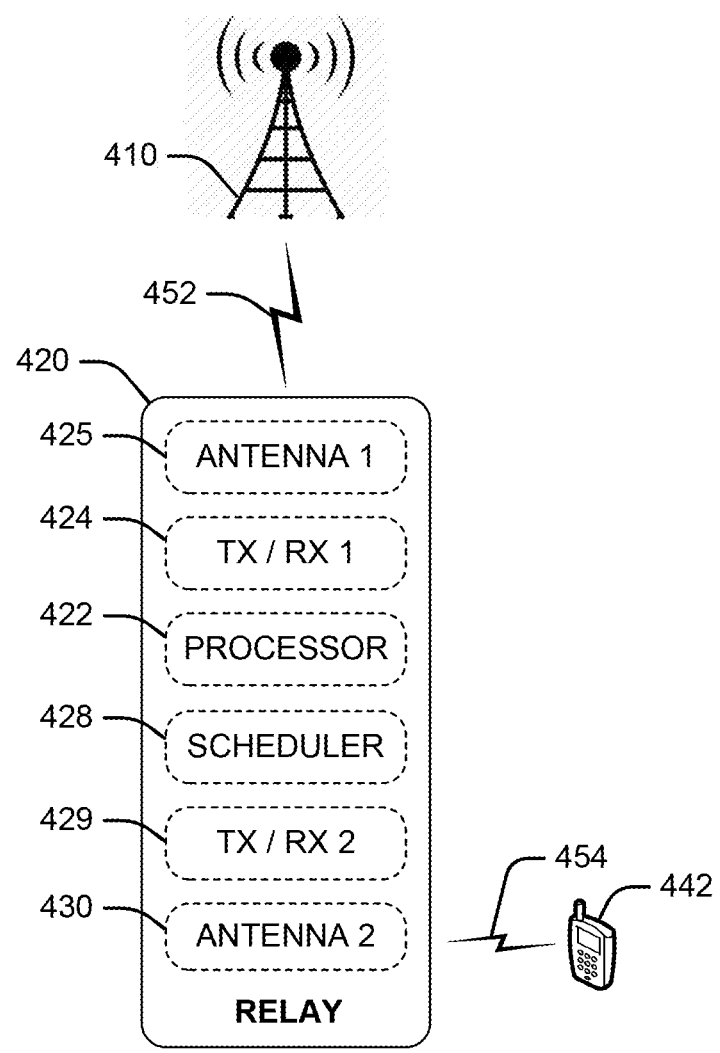
FIG. 4 depicts another exemplary relay access node combining a relay wireless device and a small-cell access node in one device.

Alternatively or in addition, the relay access node may integrate components of both relay wireless device 320 and small-cell access node 321 into a single unit. FIG. 4 depicts an exemplary relay access node 420 of this type. Relay access node 420 is illustrated as comprising an antenna 425 for direct (i.e. unrelayed) communication with donor access node 410 via wireless backhaul link 452, a transceiver 424, a processor 422, and a scheduler 428 for storing instructions that are executed by processor 422. Scheduler 428 may be a memory or other logical unit that comprises instructions for performing operations further described herein. For example, scheduler 428 schedules wireless resources on an air-interface deployed by combination of transceiver 429 and antenna 430, and can further determine and apply QoS parameters to radio bearer 454 deployed therefrom, based on a requirement of wireless device 442. Relay access node 420 may be any combination of a customer premise equipment (CPE), with one or more directional antennae and a dedicated power supply, a home eNodeB, femtocell, etc. Relay access node 420 can perform operations similar to those described with respect to FIG. 3.

Figure 5:
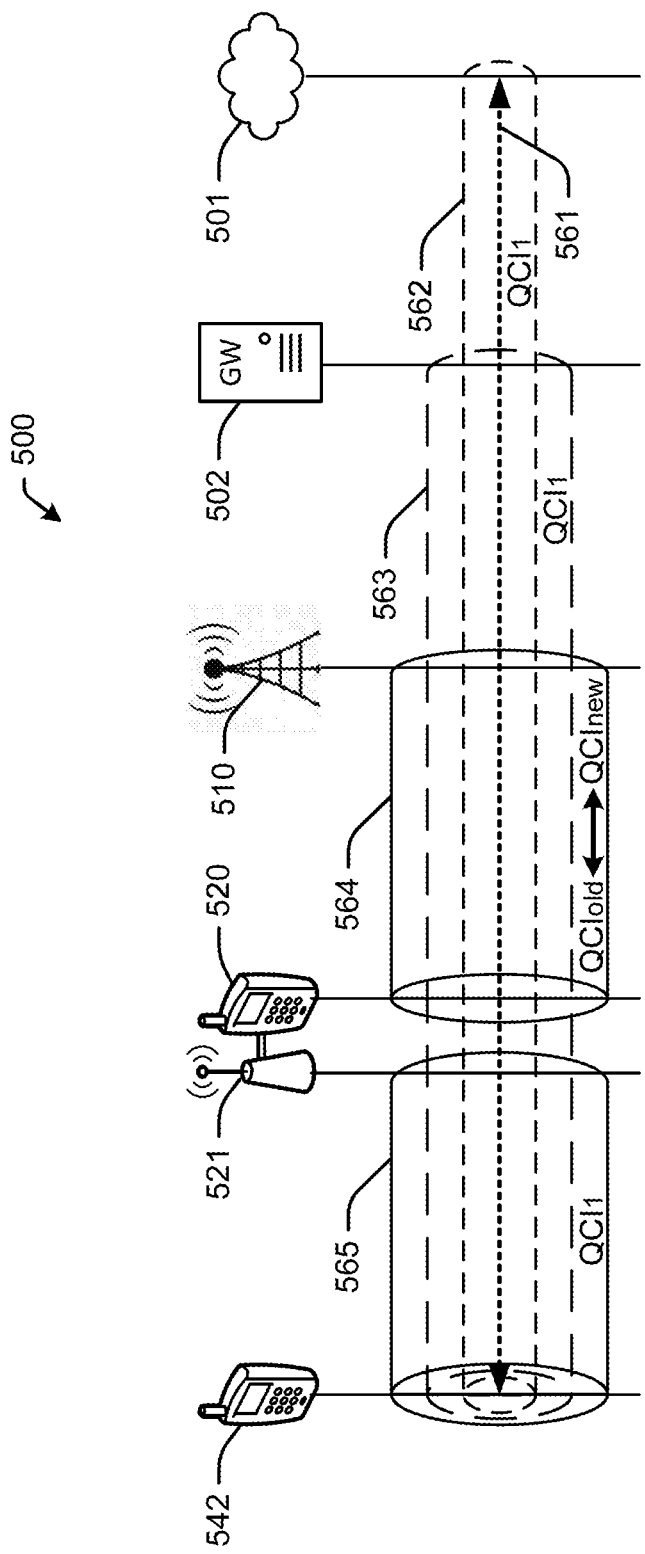
FIG. 5 depicts exemplary communication paths between a wireless device and a communication network and QoS assignments thereof.

FIG. 5 depicts exemplary communication paths between a wireless device 542 and a communication network 501 within a system 500. System 500 is generally capable of transporting voice data packets, such as Voice over LTE (VoLTE) data packets, between end-user wireless devices, access nodes, gateways, and a packet based network, using transport tunnels such as those using the GPRS tunneling protocol (GTP). For example, data session 561 between wireless device 542 and any entity on or accessible via communication network 501 may be a voice over LTE (VoLTE) session comprising a plurality of VoLTE data packets and requiring a quality class indicator $QCI_1$. Thus, various communications paths (including tunnels and bearers) are set up by system 500 to enable data session 561, and QoS parameters assigned accordingly.

For the purposes of the subject disclosure, a bearer is a virtual connection between two network components, and a bearer can comprise one or more tunnels. For example, when a wireless device attaches to a network, a default bearer is set up and lasts until the wireless device detaches, and the QoS parameters of the default bearer are defined by the network based on at least a subscription profile of the wireless device. Additional dedicated bearers may be established for the wireless device, that are associated with dedicated network resources and QoS parameters, including GBR, and so on. The QoS parameters for the dedicated bearer are mapped to data packets of a specific type and having a specific QoS requirement that must be satisfied by the bearer. Other bearers transporting the data packets between network elements can be set up to use the same or similar QoS requirements. For instance, an encapsulated packet system (EPS) bearer can transport a service data flow (SDF) that indicates the same QoS parameters as the dedicated bearer. The QoS parameters may generally correspond to a class indicator or QCI. For example, VoLTE data packets are generally assigned a QCI of 1, i.e. $QCI_1$.

Moreover, dedicated bearers can be subdivided into non-GBR and GBR types. GBR provides a guaranteed bit rate and is associated with parameters like GBR and MBR. The GBR parameter specifies a minimum guaranteed bit rate per EPS bearer, and is independently assigned for uplink and downlink transmissions. The MBR parameter indicates a maximum guaranteed bit rate per EPS bearer. Non-GBR bearers do not provide a guaranteed bit rate, and include parameters such as A-AMBR specifying an aggregate maximum bit rate, or a maximum allowed total non-GBR throughput to a specified access point name (APN), and UE-AMBR specifying an aggregate maximum bit rate or a maximum allowed total non-GBR throughput among all APN to a specific wireless device (i.e. UE). Further parameters include an allocation and retention priority (ARP) that enables a determination of whether new bearer modification or establishment request should be accepted given a current resource availability, and a traffic flow template (TFT) that is associated with a dedicated bearer and defines rules indicating to the wireless device and network as to which data packet should be sent on which specific dedicated bearer.

In the present embodiment, upon receiving a request to initiate a VoLTE session 561, a first transport bearer 562 may be initialized between network 501 and wireless device 542. The first transport bearer 562 may comprise, for instance, an end-to-end (E2E) bearer, and is associated with a specific class identifier, such as $QCI_1$. The specific class identifier is further associated with a plurality of QoS parameters for enabling and sustaining VoLTE session 561, as is known to those having ordinary skill in the art. Further, communication network 501 (and/or entities thereon) can request gateway 502 to set up a second transport bearer 563, such as an EPS bearer, between gateway 502 and wireless device 542. Gateway 502 may be one or more of a number of gateways that include S-GWs, P-GWs, and additional gateways providing communication with network 501. For example, any combination of a serving gateway (S-GW) and packet gateway (P-GW) can process the data packets in session 561 and transport them to/from wireless device 542 via EPS bearer 563. EPS bearer 563 is also assigned $QCI_1$, and can further include radio bearers 564 and 565, and other logical bearers such as S1 and S5/S8 bearers between access node 510 and one or more gateways 502 (not shown herein for the sake of clarity, but evident to one of ordinary skill in the art in light of this disclosure).

As described herein, relay wireless device 520 is configured to relay services from access node 510 to wireless device 542 via small-cell access node 521. Thus, upon relay wireless device 520 receiving instructions from access node 510 (via, for instance, first radio bearer 564), a second radio bearer 565 is set up between small-cell access node 521 and wireless device 542. Small-cell access node 521 coupled to relay wireless device 520 can be configured to encapsulate the EPS bearer 563 (along with E2E bearer 562 and VoLTE data packets 561) within a tunnel, such as a GTP tunnel, using radio bearer 565. For example, relay wireless device 520 maps a header of EPS bearer 563 to radio bearer 565, analogous to how donor access node 510 mapped the header of EPS bearer 563 to radio bearer 564. Further, radio bearer 565 can also be assigned $QCI_1$.

Further, QoS parameters of each bearer can be adjusted to meet the resource requirement of data session 561, using the methods described herein. For example, adjusting a QoS parameter of radio bearer 564 between relay wireless device 520 and donor access node 510 can improve the performance of VoIP session 561. The QoS parameter of radio bearer 564 may be changed from a first default QoS parameter to a new QoS parameter, or from the new QoS parameter to the default QoS parameter, depending on changes in the traffic amount or resource requirement thereof. Adjusting the QoS parameter can further comprise adjusting a class identifier of radio bearer 564 to meet the resource requirement of the wireless devices attached to the relay access node. In an embodiment, a new class identifier $QCI_{new}$ may be defined for radio bearer 564 and associated with relay wireless device 520. The new relay-specific class identifier is necessarily different from a default class identifier $QCI_1$ of a voice media bearer between, for instance, a directly connected wireless device and gateway 502, so as to enable donor access node 510 and relay wireless device 520 to identify the data packet and properly compress or decompress the data packet. Further, the new relay-specific class identifier is different from an old or default relay-specific class identifier $QCI_{old}$ that may not fully support the requirements of VoLTE session 563. For example, for any wireless device engaged in the same type of traffic (e.g. VoLTE), a default set of QoS parameters may have a low latency or delay, and a higher modulation and coding scheme (MCS). Thus, adjusting the class identifier of radio bearer 564 to the new class identifier $QCI_{new}$ can provide a better QoS for VoLTE session 563.

Figure 6:
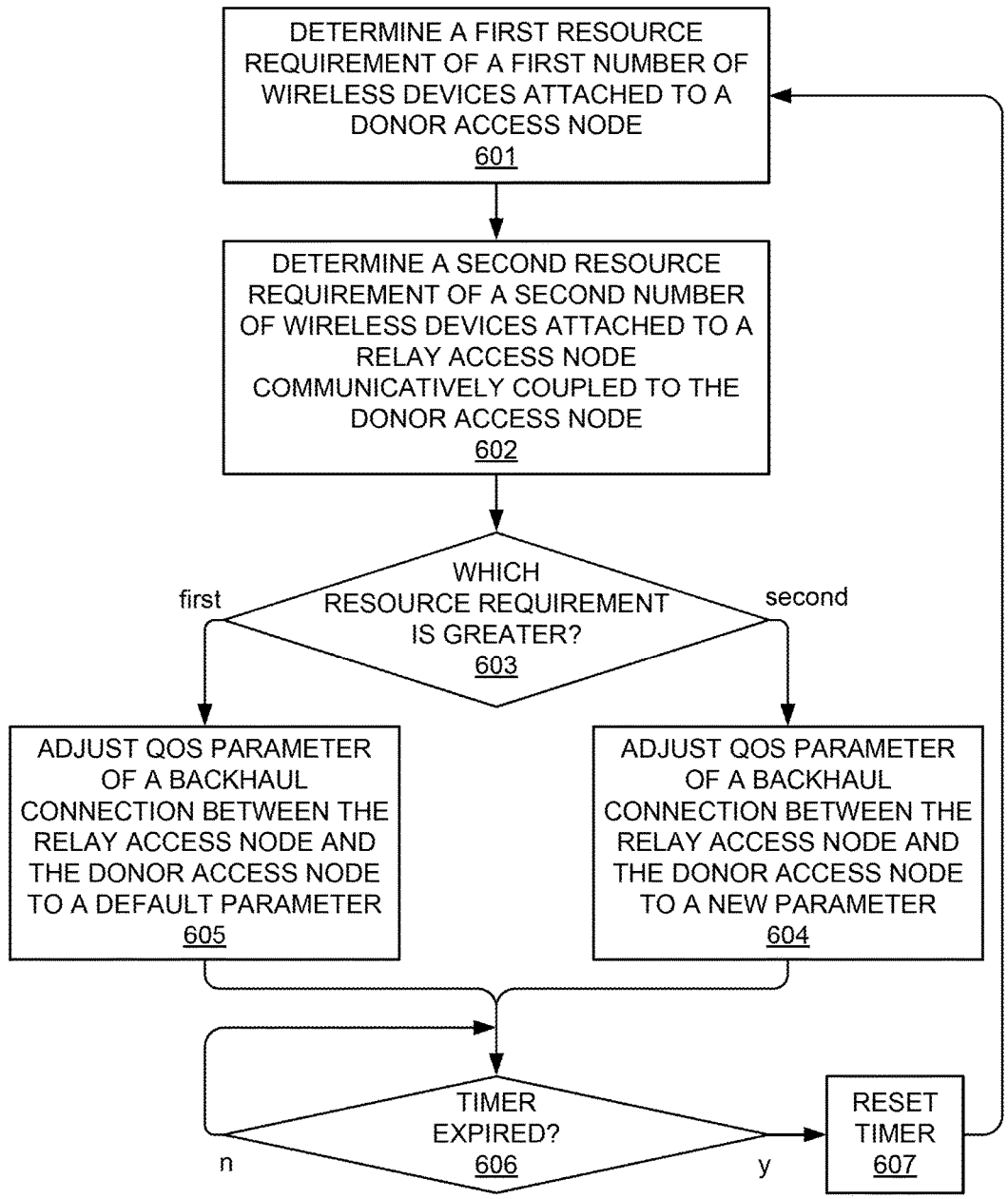
FIG. 6 depicts an exemplary method for providing a QoS to wireless devices attached to a relay access node based on comparison of resource requirements.

FIG. 6 depicts an exemplary method for providing a QoS to wireless devices attached to a relay access node based on comparison of resource requirements. The operations in FIG. 6 may be performed by a scheduler component of an access node such as access nodes 110, 210, 510, or by any other network node. In other embodiments, the method can be implemented with any suitable network element. Although FIG. 6 depicts steps performed in a particular order for purposes of illustration and discussion, the operations discussed herein are not limited to any particular order or arrangement. One skilled in the art, using the disclosures provided herein, will appreciate that various steps of the depicted methods can be omitted, rearranged, combined, and/or adapted in various ways.

At 601, a first resource requirement is determined for a first number of wireless devices attached to a donor access node. The first number of wireless devices may be directly-connected wireless devices, i.e. not attached to a relay access node. The donor access node may be configured to provide access to a communication network for the first number of wireless devices over a wireless air interface deployed by the donor access node. In some embodiments, determining the resource requirement may be based on monitoring radio bearers associated with each of the directly-connected wireless devices. For example, traffic over a transport bearer between a wireless device and a gateway (such as an evolved packet system or EPS bearer) or a radio bearer between a wireless device and the donor access node may be monitored to determine the resource requirements thereof. In some embodiments, the resource requirement may be based on the number of wireless devices engaged in communication of a specific type of data or traffic, such as a VoLTE session. The type of traffic may be determined by a deep packet inspection of VoLTE packets.

At 602, a second resource requirement is determined for a second number of wireless devices attached to a relay access node. For example, the donor access node is configured to provide access to the communication network for wireless devices attached to a relay access node. The relay access node (or a relay wireless device portion thereof) is communicably coupled to the donor access node via a wireless backhaul link on the wireless air interface. The relay access node (or a small-cell access node portion thereof) further deploys a second wireless air interface, thereby enabling the second number of wireless devices to attach to the small-cell access node. In some embodiments, determining the resource requirement may be based on monitoring radio bearers associated with each of the second number of wireless devices. For example, traffic over a transport bearer between a wireless device and a gateway (such as an evolved packet system or EPS bearer) or a radio bearer between a wireless device and the relay access node may be monitored to determine the resource requirements thereof. In some embodiments, the resource requirement may be based on the number of wireless devices engaged in communication of a specific type of data or traffic, such as a VoLTE session. The type of traffic may be determined by a deep packet inspection of VoLTE packets.

At 603, the first resource requirement is compared with the second resource requirement to determine which is greater. Resource requirements may be compared in terms of a number of devices, bearers of a specific type of data, or amount of data. In either case, if the second resource requirement (i.e. that of the second number of wireless devices connected to the relay access node) is greater then, at 604, a QoS parameter of the backhaul connection of the relay access node is adjusted to a new QoS parameter. The new QoS parameter may be selected to meet the resource requirement, so as to improve the performance of the wireless backhaul link, consequently improving the performance of the wireless air interface deployed by the relay access node. Adjusting the QoS parameter of the wireless backhaul link can comprise adjusting a class identifier of the wireless backhaul link to meet the resource requirement of the wireless devices attached to the relay access node. QoS parameters include one or more of a QoS Class Indicator (QCI) of the radio bearer, a priority, a delay, a loss rate, a guaranteed bit rate, or any other parameter. In some embodiments, adjusting the QCI triggers other adjustments, as provided by a network configuration. In some embodiments, the new QoS parameter is the same as a default QoS parameter associated with a bearer of a directly-connected wireless devices engaged in the VoLTE (or equivalent resource-intensive session).

On the other hand, if the resource requirement of the first one or more wireless devices is greater then, at 605, the QoS parameter of the wireless backhaul link is adjusted from the new QoS parameter to the default QoS parameter. This reverse adjustment is useful to ensure that a user experience of directly-connected wireless devices engaged in a resource-intensive session is not compromised. Further, the determining and adjusting steps may be performed periodically. For example, at 606, it is determined whether or not a timer is expired. The timer may be a transmission time interval (TTI) of the network, or a different time period such as 1 s. or 10 s. and is configurable. Upon expiration of the timer, the determination steps 601 and 602 are repeated. In this way, the QoS parameter of the wireless backhaul link can continuously be adjusted in real time based upon the resource requirements of each of the first and second numbers of wireless devices.

Figure 7:
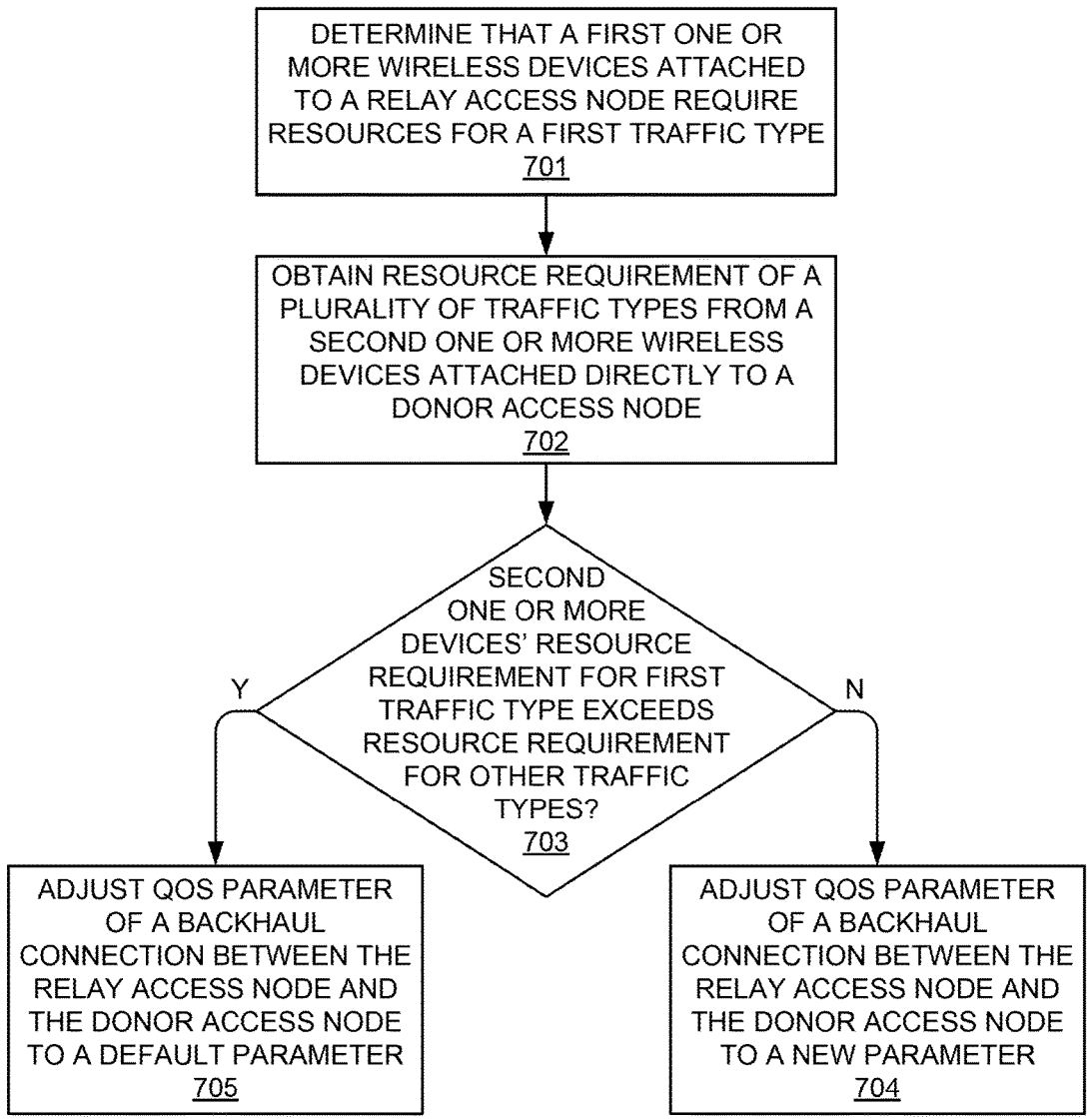
FIG. 7 depicts an exemplary method for providing a QoS to wireless devices attached to a relay access node based on resource requirements of a traffic type.

As described herein, the adjustment of QoS parameters may be based on a type of traffic that requires a specific QoS (such as, for instance, VoLTE traffic). FIG. 7 depicts an exemplary method for providing a QoS to wireless devices attached to a relay access node based on resource requirements of a traffic type. The operations in FIG. 7 may be performed by a scheduler component of an access node such as access nodes 110, 210, 510, or by any other network node. In other embodiments, the method can be implemented with any suitable network element. Although FIG. 7 depicts steps performed in a particular order for purposes of illustration and discussion, the operations discussed herein are not limited to any particular order or arrangement. One skilled in the art, using the disclosures provided herein, will appreciate that various steps of the depicted methods can be omitted, rearranged, combined, and/or adapted in various ways.

At 701, it is determined that a first one or more wireless devices attached to a relay access node require resources for a first traffic type. The relay access node (or a relay wireless device portion thereof) is communicably coupled to the donor access node via a wireless backhaul link on the wireless air interface. The relay access node (or a small-cell access node portion thereof) further deploys a wireless air interface, thereby enabling the second number of wireless devices to attach to the small-cell access node. Further, the resource requirement may be based on monitoring radio or transport bearers associated with each of the first one or more wireless devices. The type of traffic may be determined by a deep packet inspection of the data packets transported on the bearers. Such determinations can further be based on requests from the wireless devices or from other network entities to set up said radio and transport bearers.

At 702, resource requirements of a plurality of traffic types are obtained from a second one or more wireless devices that are directly-connected to the donor access node, i.e. without being attached to the relay access node. For example, the donor access node may be configured to provide access to a communication network for the second one or more wireless devices over a wireless air interface deployed by the donor access node. The resource requirement may be based on monitoring radio or transport bearers associated with each of the second one or more wireless devices. The various types of traffic (including resource-intensive traffic such as VoLTE or gaming, or any other traffic such as signaling or messaging) may be determined by a deep packet inspection of the data packets transported on the bearers. Such determinations can further be based on requests from the wireless devices or from other network entities to set up said radio and transport bearers. Moreover, the resource requirements may be based on an amount of each type of traffic, a number of bearers, or any other metric.

At 703, resource requirements of the first type of traffic by the second one or more devices are compared with the resource requirements of other types of traffic in order to determine how to adjust the QoS parameter of the wireless backhaul link. For example, a ratio is determined of the requirement of the first type of traffic with the requirement of other types of traffic, or a ratio of each type of traffic to a total amount of traffic. If the requirement of the first type of traffic does not exceed the requirement of all other types of traffic, if the ratio of the first type of traffic to the other types of traffic is less than 1:1, or if the ratio of the first type of traffic is less than 50% of the total traffic, then, at 704, the QoS parameter of the wireless backhaul link is adjusted to the new QoS parameter. These ratio and percentage thresholds are configurable to other values per the network operator's needs.

However, if the second one or more directly-connected wireless devices are utilizing (or requesting resources for) the first type of traffic to a degree that exceeds all other types of traffic then, at 705, the QoS parameter of the wireless backhaul link is adjusted to the default QoS, thereby avoiding severe reductions in QoS for the directly-connected wireless devices. The new QoS parameter may be selected to meet the resource requirement, so as to improve the performance of the wireless backhaul link, consequently improving the performance of the wireless air interface deployed by the relay access node. Adjusting the QoS parameter of the wireless backhaul link can comprise adjusting a class identifier of the wireless backhaul link to meet the resource requirement of the wireless devices attached to the relay access node. QoS parameters include one or more of a QoS Class Indicator (QCI) of the radio bearer, a priority, a delay, a loss rate, a guaranteed bit rate, or any other parameter. In some embodiments, adjusting the QCI triggers other adjustments, as provided by a network configuration. In some embodiments, the new QoS parameter is the same as a default QoS parameter associated with a bearer of a directly-connected wireless devices engaged in sessions of the first traffic type.

Figure 8:
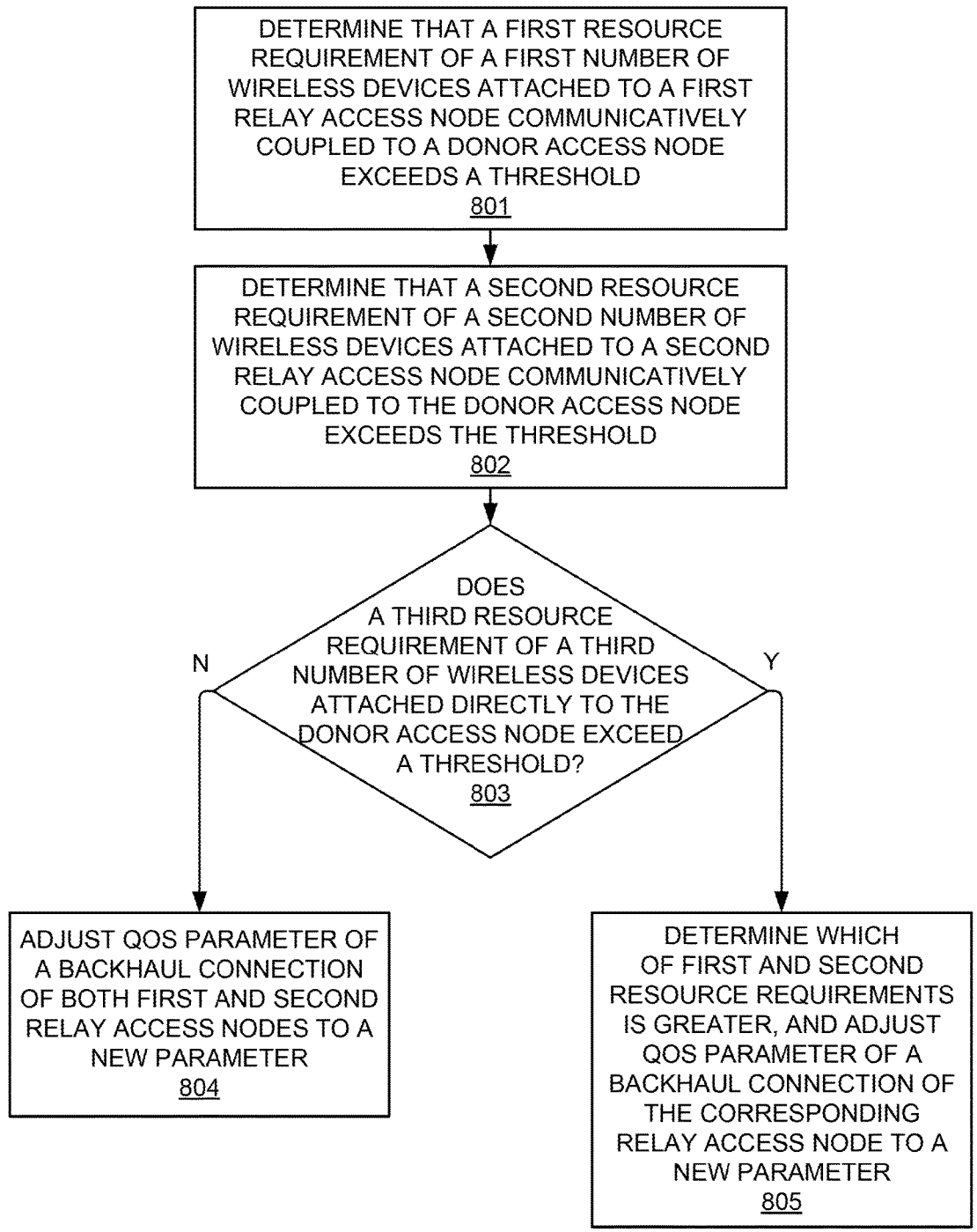
FIG. 8 depicts an exemplary method for providing a QoS to wireless devices attached to two relay access nodes based on comparison of resource requirements with thresholds.

In another embodiment, a resource requirement and/or amount of a type of traffic can be compared with predefined or dynamic thresholds to determine how to adjust the QoS parameter. FIG. 8 depicts an exemplary method for providing a QoS to wireless devices attached to two relay access nodes based on comparison of resource requirements with thresholds. The operations in FIG. 8 may be performed by a scheduler component of an access node such as access nodes 110, 210, 510, or by any other network node. In other embodiments, the method can be implemented with any suitable network element. Further, the method of FIG. 8 may be implemented in a system with two or more relay access nodes, such as system 100 in FIG. 1. Although FIG. 8 depicts steps performed in a particular order for purposes of illustration and discussion, the operations discussed herein are not limited to any particular order or arrangement. One skilled in the art, using the disclosures provided herein, will appreciate that various steps of the depicted methods can be omitted, rearranged, combined, and/or adapted in various ways.

At 801, it is determined that a first resource requirement of a first number of wireless devices attached to a first relay access node exceeds a threshold. The first relay access node (or a relay wireless device portion thereof) is communicably coupled to the donor access node via a wireless backhaul link on the wireless air interface. The first relay access node (or a first small-cell access node portion thereof) further deploys a first wireless air interface, thereby enabling the first number of wireless devices to attach to the first small-cell access node. Further, the resource requirement may be based on monitoring radio or transport bearers associated with each of the first one or more wireless devices. The resource requirement may be based on an amount of traffic transported (or scheduled to be transported) over a bearer associated with each wireless device to determine whether or not an amount of traffic exceeds a threshold amount.

At 802, it is determined that a second resource requirement of a second number of wireless devices attached to a second relay access node exceeds a threshold. The second relay access node (or a second relay wireless device portion thereof) is communicably coupled to the donor access node via a wireless backhaul link on the wireless air interface. The second relay access node (or a second small-cell access node portion thereof) further deploys a second wireless air interface, thereby enabling the second number of wireless devices to attach to the second small-cell access node. Further, the resource requirement may be based on monitoring radio or transport bearers associated with each of the second one or more wireless devices. The resource requirement may be based on an amount of traffic transported (or scheduled to be transported) over a bearer associated with each wireless device to determine whether or not an amount of traffic exceeds a threshold amount.

At 803, a third resource requirement of a third number of wireless devices directly attached to a donor access node is obtained, and compared with a threshold. The donor access node deploys a third wireless air interface, thereby enabling the third number of wireless devices to directly attach to the donor access node. Further, the third resource requirement may be based on monitoring radio or transport bearers associated with each of the third one or more wireless devices. The resource requirement may be based on an amount of traffic transported (or scheduled to be transported) over a bearer associated with each wireless device to determine whether or not an amount of traffic exceeds a threshold amount. Alternatively or in addition, the first, second, and third resource requirements are based on a type of traffic, and the third resource requirement is compared with a resource requirement for all other traffic types transported to/from the third number of wireless devices.

In either case, if the third resource requirement does not exceed the threshold then, at 804, a QoS parameter of the wireless backhaul link of each of the first and second relay access nodes is adjusted to the new QoS parameter. This is based on the determination that the third number of (directly-connected) wireless devices are not engaged in a threshold amount of resource-intensive data transmission and, therefore, would not suffer from a diminished QoS. If, however, the third resource requirement is determined to exceed the threshold then, at 805, the QoS parameter of only one of the wireless backhaul links is set to the new QoS parameter. This necessitates a determination of which among the first and second numbers of wireless devices has a greater resource requirement. In other words, if the third resource requirement exceeds the threshold, then only one among the first and second resource requirements is granted the new QoS parameter.

The new QoS parameter may be selected to meet the resource requirement, so as to improve the performance of the wireless backhaul link, consequently improving the performance of the wireless air interface deployed by the relay access node. Adjusting the QoS parameter of the wireless backhaul link can comprise adjusting a class identifier of the wireless backhaul link to meet the resource requirement of the wireless devices attached to the relay access node. QoS parameters include one or more of a QoS Class Indicator (QCI) of the radio bearer, a priority, a delay, a loss rate, a guaranteed bit rate, or any other parameter. In some embodiments, adjusting the QCI triggers other adjustments, as provided by a network configuration. In some embodiments, the new QoS parameter is the same as a default QoS parameter associated with a bearer of a directly-connected wireless devices engaged in sessions of the first traffic type.

The operations described above in FIGS. 6-8 may be rearranged in any combination and implemented into systems based on the needs of a network operator. For example, resource requirements (and resource usage) of wireless devices attached to various combinations of donor access nodes and relay access nodes may be evaluated and compared with each other and with thresholds to determine how to adjust the QoS of each wireless backhaul link. The thresholds may be static or dynamic/floating. For example, the resource requirement of directly-connected wireless devices may be used as a threshold against which to compare the resource requirement of relayed wireless devices. In other embodiments, differences in a ratio of usage of the first type of traffic versus other types of traffic, for directly-connected wireless devices, may alter the threshold against which the resource requirement of relayed wireless devices is compared.

The methods, systems, devices, networks, access nodes, and equipment described above may be implemented with, contain, or be executed by one or more computer systems and/or processing nodes. The methods described above may also be stored on a non-transitory computer readable medium. Many of the elements of communication system 100 may be, comprise, or include computers systems and/or processing nodes. This includes, but is not limited to: donor access node 110, small-cell access nodes 120, 130, wireless devices 141, 142, 143, gateways 102, controller node 104, and/or network 101.

Figure 9:
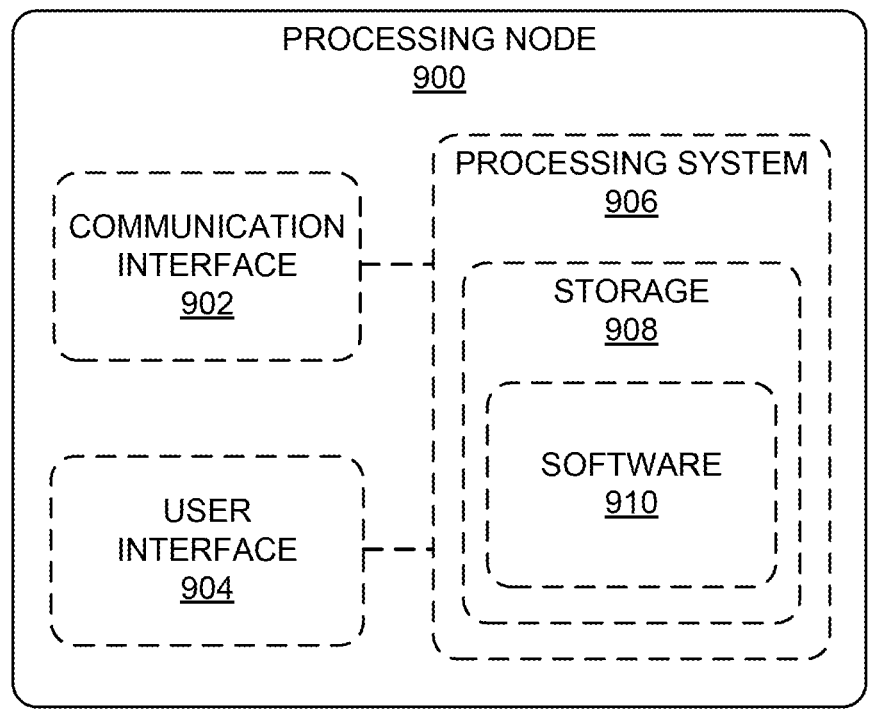
FIG. 9 depicts an exemplary processing node for providing a QoS to wireless devices attached to a relay access node.

FIG. 9 depicts an exemplary processing node 900 comprising communication interface 902, user interface 904, and processing system 906 in communication with communication interface 902 and user interface 904. Processing system 906 includes storage 908, which can comprise a disk drive, flash drive, memory circuitry, or other memory device. Storage 908 can store software 910 which is used in the operation of the processing node 900. Storage 908 may include a disk drive, flash drive, data storage circuitry, or some other memory apparatus. Software 910 may include computer programs, firmware, or some other form of machine-readable instructions, including an operating system, utilities, drivers, network interfaces, applications, or some other type of software. For example, software 910 may include modules for perform the operations described with reference to FIGS. 6-8. Processing system 906 may include a microprocessor and other circuitry to retrieve and execute software 910 from storage 908. Processing node 900 may further include other components such as a power management unit, a control interface unit, etc., which are omitted for clarity. Communication interface 902 permits processing node 900 to communicate with other network elements. User interface 904 permits the configuration and control of the operation of processing node 900.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method for providing a quality of service (QoS) to wireless devices attached to a relay access node, the method comprising:

comparing a first amount of a first traffic type between a donor access node and a first one or more wireless devices in communication with the donor access node via the relay access node with a second amount of the first traffic type between the donor access node and a second one or more wireless devices attached directly to the donor access node without an intervening relay access node;

determining that the first amount exceeds the second amount;

adjusting a quality of service (QoS) parameter of a wireless backhaul link between the relay access node and the donor access node from a first default QoS parameter to a new QoS parameter;

determining that the first amount is smaller than the second amount; and adjusting the QoS parameter from the new QoS parameter to the default QoS parameter.

2. The method of claim 1, further comprising determining the first amount of the first type of traffic based on monitoring any combination of:

radio bearers between the first one or more wireless devices and the relay access node, evolved packet system (EPS) bearers between the first one or more wireless devices and a core network node, and received requests to set up said radio and EPS bearers.

3. The method of claim 1, further comprising determining, for the second one or more wireless devices attached directly to the donor access node, that a ratio of the first type of traffic to other types of traffic is smaller than a threshold ratio, prior to adjusting the QoS parameter.

4. The method of claim 3, further comprising:

determining, for the second one or more devices, that the ratio of the first type of traffic to other types of traffic is larger than the threshold ratio; and adjusting the QoS parameter from the new QoS parameter to the first default QoS parameter.

5. The method of claim 1, wherein the new QoS parameter comprises a second default QoS parameter associated with a bearer between the donor access node and the second one or more wireless devices.

6. The method of claim 1, wherein adjusting the QoS parameter of the wireless backhaul link comprises adjusting a QoS Class Indicator (QCI) of a radio bearer utilizing the wireless backhaul link.

7. The method of claim 6, wherein adjusting the QCI of the radio bearer triggers an adjustment in adjusting one or more of a priority, a delay, a loss rate, or a guaranteed bit rate provided by the radio bearer.

8. The method of claim 1, further comprising performing the comparing, determining, and adjusting steps periodically.

9. A system for providing a quality of service (QoS) to wireless devices attached to a relay access node, the system comprising:

a donor access node configured to provide wireless services to a first plurality of wireless devices directly attached to the donor access node without an intervening relay access node and to a second plurality of wireless devices attached to a relay access node, wherein the relay access node is communicably coupled to the donor access node via a wireless backhaul link; and a processor coupled to the donor access node, the processor for configuring the donor access node to perform operations comprising:

comparing a first resource requirement of the first plurality of wireless devices with a second resource requirement of the second plurality of wireless devices, wherein both first and second resource requirements as associated with a same type of traffic;

determining that the first resource requirement of the first plurality of wireless devices is smaller than the second resource requirement of the second plurality of wireless devices; and changing a class identifier of the wireless backhaul link from a default class identifier to a new class identifier to meet the second resource requirement;

determining that the second resource requirement is smaller than the first resource requirement; and changing the class identifier from the new class identifier to the default class identifier.

10. The system of claim 9, wherein the first and second resource requirements are based on identifying the same type of traffic requested for the first and second pluralities of wireless devices respectively.

11. The system of claim 10, wherein the same type of traffic comprises voice over LTE (VoLTE) traffic.

12. The system of claim 10, wherein:

the first resource requirement is based on an amount of the same type of traffic on a first plurality of bearers corresponding to the first plurality of wireless devices, and the second resource requirement is based on an amount of the same type of traffic on a second plurality of bearers corresponding to the second plurality of wireless devices.

13. The system of claim 12, wherein the first and second plurality of bearers comprise evolved packet system (EPS) bearers.

14. The system of claim 9, wherein:

the relay access node comprises a relay wireless device configured to communicate with the donor access node, and a small-cell access node coupled to the relay wireless device, and the second plurality of wireless devices is attached to the small-cell access node.

15. A processing node for providing a quality of service (QoS) to one or more wireless devices, the processing node being configured to perform operations comprising:

obtaining a first number of transport bearers associated with a first traffic type between a first one or more wireless devices and a wireless network, wherein the first one or more wireless devices are directly attached to a donor access node without an intervening relay access node;

obtaining a second number of transport bearers associated with the first traffic type between a second one or more wireless devices and the wireless network, wherein the second one or more wireless devices are attached to a relay access node communicably coupled to the donor access node via a first radio bearer;

comparing the first number with the second number; and upon determining that the second number exceeds the first number, modifying a first set of QoS parameters of the first radio bearer to a second set of QoS parameters to meet a resource requirement of the second number of wireless devices;

determining that the second number is smaller than the first number; and returning the second set of QoS parameters to the first set of QoS parameters.

16. The processing node of claim 15, wherein each of the second number of wireless devices is attached to the relay access node via a corresponding second radio bearer.

17. The processing node of claim 16, wherein each corresponding second radio bearer is associated with second set of QoS parameters.

* * * * *